(12) United States Patent
Guarnaccia et al.

(10) Patent No.: US 8,458,427 B2
(45) Date of Patent: Jun. 4, 2013

(54) SYNCHRONIZATION SYSTEM AND RELATED INTEGRATED CIRCUIT

(75) Inventors: Giuseppe Guarnaccia, Catania (IT); Raffaele Guarrasi, Grenoble (FR); Radhia Kacem, Ariana (TN)

(73) Assignees: STMicroelectronics S.r.l., Agrate Brianza (MI) (IT); STMicroelectronics SA, Montrouge (FR); STMicroelectronics (Grenoble) SAS, Grenoble (FR)

( * ) Notice: Subject to any disclaimer, the term of this patent is extended or adjusted under 35 U.S.C. 154(b) by 214 days.

(21) Appl. No.: 13/022,099

(22) Filed: Feb. 7, 2011

(65) Prior Publication Data

US 2011/0213944 A1 Sep. 1, 2011

(30) Foreign Application Priority Data

Feb. 26, 2010 (IT) .................................. TO10A0146

(51) Int. Cl.
*G06F 12/00* (2006.01)
(52) U.S. Cl.
USPC ................................... 711/167; 711/E12.001
(58) Field of Classification Search
USPC .......................................... 711/167, E12.001
See application file for complete search history.

(56) References Cited

U.S. PATENT DOCUMENTS

| 5,535,377 A | 7/1996 | Parks | |
|---|---|---|---|
| 2007/0283056 A1* | 12/2007 | Miro Panades | 710/57 |
| 2009/0049212 A1* | 2/2009 | Mangano et al. | 710/61 |

OTHER PUBLICATIONS

Search report and Written Opinion for Italian patent application No. TO2010A000146, date of completion of search Sep. 27, 2010, pgs. 7.

* cited by examiner

*Primary Examiner* — Jasmine Song
(74) *Attorney, Agent, or Firm* — Hogan Lovells US LLP (57) ABSTRACT

A synchronization system includes a memory and a control circuit. The control circuit includes a write interface for writing data in said memory with a first clock signal, wherein the write interface is configured for operating with a write pointer in response to a write command, a read interface for reading data from said memory with a second clock signal, wherein the read interface is configured for operating with a read pointer in response to a read command, a synchronization circuit for synchronizing said write pointer and said read pointer with a synchronization latency, and an elaboration circuit for elaborating data in memory with an elaboration latency, wherein the elaboration latency is smaller than the synchronization latency.

20 Claims, 5 Drawing Sheets

SYNCHRONIZATION SYSTEM AND RELATED INTEGRATED CIRCUIT

RELATED APPLICATION

The present application claims priority of Italian Patent Application No. TO2010A000146 filed Feb. 26, 2010, which is incorporated herein in its entirety by this reference.

BACKGROUND OF THE INVENTION

1. Field of the Invention

This disclosure relates to techniques for synchronizing data through different frequency domains.

This disclosure was devised with specific attention paid to its possible application for optimising the speed of a synchronization circuit comprising at least one FIFO memory.

2. Description of the Related Art

In modern integrated circuits of the System-on-Chip (SoC) type, several locally synchronous frequency domains often coexist, and they have to communicate with one another. As a matter of fact, the various modules (for example processors, audio and video decoders, memories, etc.) may operate at different frequencies, but their traffic flows converge into common channels and suitable conversions must often be performed in order to pass from one domain to the other.

In most instances, such domains are totally unrelated one to the other. For example, clock trees might be generated by different Phase Locked Loops (PLLs) or else, though being generated by the same PLL, it is not possible to infer the phase relation between each clock tree.

In these cases, the required conversion is considered to be totally asynchronous; therefore, in the interaction between two domains, it is impossible not to take into account metastability problems.

Typically, the interconnection system uses specific components, dedicated to frequency conversion. They receive input data at a given frequency (reception frequency) and they are adapted to generate the same data at a given target frequency.

In order to optimize such a flow and not to limit or jeopardize the information traffic, such components include buffering elements through which the possible "gaps" due to synchronization are eliminated or reduced.

A classical approach to going through different clock domains involves a datapath storage within FIFO memories.

As a matter of fact, a FIFO memory typically comprises a first communication interface for writing data to the FIFO memory (i.e. a write interface) and a second communication interface for reading data from the FIFO memory (i.e. a read interface). In general, such communication interfaces can operate in different frequency domains.

These FIFO memories typically comprise a circular buffer, i.e. a buffer comprising a limited number of memory locations, wherein the position following the last memory location is again the first memory location.

The write and read accesses are usually handled via a control circuit. For example, starting from write and/or read commands, the control circuit can control respective write and read pointers, which indicate e.g. respective locations for writing or reading data.

For example, Gray code pointers are normally used. Actually, the Gray code is adopted in order to enhance asynchronous communication and to avoid problems related to the sampling of asynchronous signal.

Figure 1:
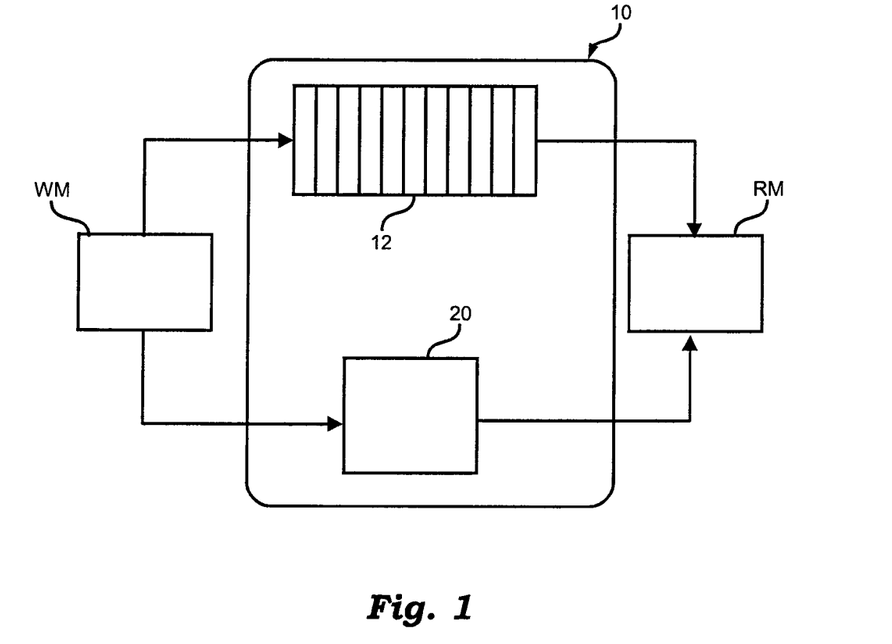

FIG. 1 shows a possible architecture of a FIFO memory 10, comprising a buffer or circular memory 12 and a control circuit 20.

For example, a write module WM can write data to memory 10 at the frequency of a first clock signal CLK1, and a read module RM can read data from memory 10 at the frequency of a second clock signal CLK2.

In order to spot the current write and read locations in memory 12, the control circuit 20 controls a write pointer, for example a Gray code write pointer, and a read pointer, for example a Gray code read pointer.

The control circuit 20 can also generate a status signal, that shows a condition in which the buffer is empty (EMPTY) and a condition in which the buffer is full (FULL). For example, to this purpose the circuit 20 can synchronize the write pointer through a chain of registers linked to the clock signal CLK2. Only after the coded pointer has gone through the synchronization chain can the write pointer be compared with the read pointer used in the domain of the clock signal CLK2.

In the meanwhile, the data item corresponding to the written location has stabilised and is ready to be read in the domain of the clock signal CLK2.

SUMMARY OF THE INVENTION

The inventors have observed that each data item written to the FIFO is only available when the pointers have been synchronized via the synchronization chain. As a matter of fact, in order for a data item to pass from the write module domain to the read module domain, the pointer corresponding to its position must be synchronized from one domain to another, before being compared.

The object of the invention is to provide a solution allowing use of this latency, introduced by the synchronization chain, in order to perform an elaboration of the data written in the FIFO memory.

In view of achieving the above mentioned object, the invention concerns a system having the features set forth as follows: A synchronization system includes a memory and a control circuit. The control circuit includes a write interface for writing data in said memory with a first clock signal, wherein the write interface is configured for operating with a write pointer in response to a write command, a read interface for reading data from said memory with a second clock signal, wherein the read interface is configured for operating with a read pointer in response to a read command, a synchronization circuit for synchronizing said write pointer and said read pointer with a synchronization latency, and an elaboration circuit for elaborating data in memory with an elaboration latency, wherein the elaboration latency is smaller than the synchronization latency.

The invention also concerns a related integrated circuit. Further advantageous features of the invention are the object of the dependent claims.

The claims are an integral part of the technical teaching of the invention provided herein.

The inventors have observed that the latency introduced by a synchronization chain of a synchronization circuit can be used for elaborating the data written in memory before they are read by the memory.

In various embodiments, the synchronization circuit comprises a memory and a control circuit.

In various embodiments, the control circuit comprises both a write interface, adapted to write data in the memory via a first clock signal, and a read interface, adapted to read data from the memory via a second clock signal. For example, the write interface can operate with a write pointer in response to a write command, and the read interface can operate with a read pointer in response to a read command.

In various embodiments, a synchronization circuit is used for synchronizing the write pointer with the read pointer with a synchronization latency. For example, this synchronization is often used in FIFO memories that are based on a circular buffer. In this case the control circuit usually generates status signals on the basis of such pointers. For example, these status signals may include a status signal indicating a condition in which the circular buffer is empty, and a status signal indicating a condition in which the circular buffer is full.

In various embodiments, the synchronization circuit also includes an elaboration circuit, adapted to elaborate data in the memory with an elaboration latency, wherein the elaboration latency is smaller than the synchronization latency. For example, the elaboration circuit may be a combinational circuit or a sequential circuit. In various embodiments, the elaboration circuit receives, from a memory location, the last data item written in the memory via the write interface; it then elaborates such read data and sends the elaborated data to the original memory location.

For example, in order to allow an independent access to memory, the memory may be a dual port RAM memory. In this case, the first port can be connected to the control circuit, and the second port to the elaboration circuit.

BRIEF DESCRIPTION OF THE DRAWINGS

The invention will now be described, by way of example only, with reference to the enclosed drawings, wherein:

FIG. 1 has been previously described;

DETAILED DESCRIPTION

In the following description, numerous specific details are given to provide a thorough understanding of embodiments. The embodiments can be practiced without one or more of the specific details, or with other methods, components, materials, etc. In other instances, well-known structures, materials, or operations are not shown or described in detail to avoid obscuring aspects of the embodiments.

Reference throughout this specification to "one embodiment" or "an embodiment" means that a particular feature, structure, or characteristic described in connection with the embodiment is included in at least one embodiment. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

The headings provided herein are for convenience only and do not interpret the scope or meaning of the embodiments.

As previously mentioned, data are usually written in a FIFO memory at a specific frequency, and they are read at the target frequency. The inventors have observed that each data written in the FIFO memory is only available when the pointers have been synchronized via a synchronization chain. As a matter of fact, in order for a data item to pass from clock domain CLK1 to clock domain CLK2, it is necessary for the pointer corresponding to its position to be synchronized from one domain to the other, in order to be successively compared.

Figure 2:
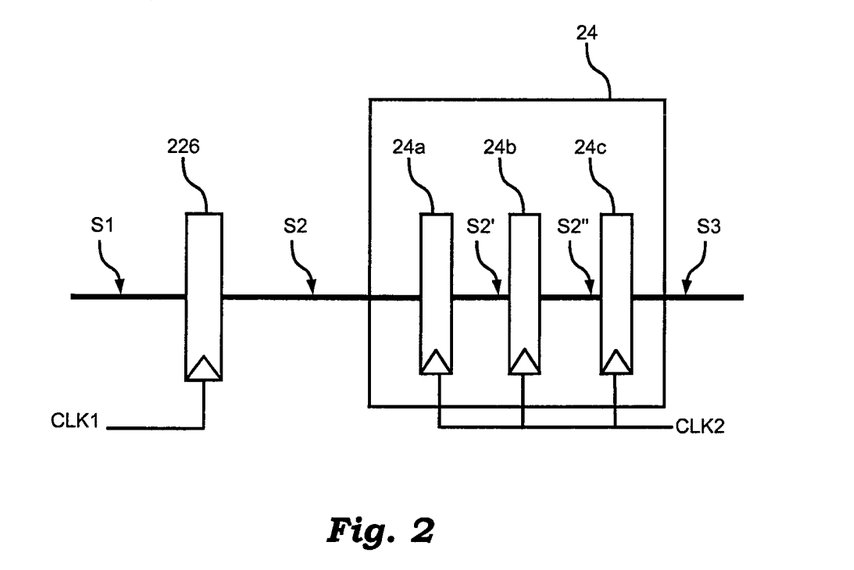
FIG. 2 shows an embodiment of a synchronization chain.

FIG. 2 shows a possible embodiment of this synchronization chain for the passage of an S1 pointer from clock domain CLK1 to clock domain CLK2.

In the presently considered example, a write pointer S1 is written in a register 226 in the same cycle during which the data is written in the FIFO memory, i.e. the signal S2 at the output of register 226 is updated with the clock signal frequency.

The signal S2 at the output of register 226 is then synchronized through a synchronization chain 24, driven by the clock signal CLK2.

A synchronization chain typically comprises two or three synchronization registers. For example, the synchronization chain 24 shown in FIG. 2 comprises three synchronization registers 24a, 24b and 24c.

This means that the minimum latency is present if the signal S2 varies its value at the incoming of the front of the clock signal CLK2. In this case, the first register of the synchronization chain might be transparent (which evidently implies a hold time violation) and it would be visible at the level of signal S2' at the output of register 24a.

Considering that among the registers 24a, 24b and 24c, belonging to the same clock domain, a hold fix is performed (because otherwise the signal S2 might go through all three synchronization registers), signal S2' will employ a whole cycle of the clock signal CLK2 in order to be seen as a signal S2" at the output of register 24b, and it will employ a further cycle until the signal S3 at the output of register 24c is updated.

On the whole, therefore, from the moment when the data has been recorded in the domain of the clock signal CLK1, until the moment when the data is recordable in the domain of clock signal CLK2, at least three complete cycles of clock signal CLK2 will have elapsed (in addition to possible propagation times, for example for the propagation of signal S2).

The inventors have observed that this time can be used to perform an elaboration of the data written in the FIFO memory.

As a matter of fact, the modules controlling frequency conversion also perform data transformations, possibly executing some conversions in parallel. However, such processing is carried out before writing the data in the FIFO memory and/or after reading the data from the FIFO memory. This means that data elaboration and frequency conversion are normally handled separately and serially, as schematically depicted in FIG. 3.

Figure 3:
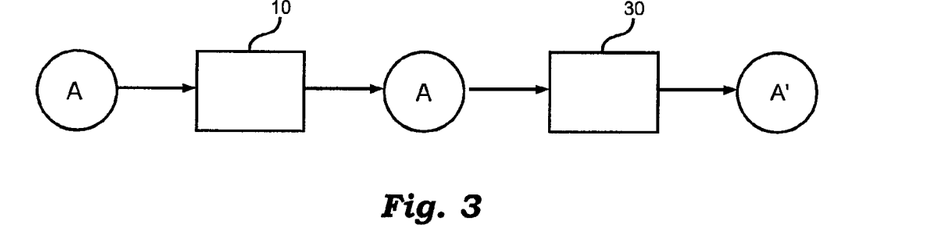
FIG. 3 shows an example of a synchronization system including a module performing a data elaboration.

In the example shown in FIG. 3, a data item A is written in a FIFO memory 10 with a clock signal CLK1. After synchronizing the pointers with a typical latency of two to three cycles of the clock signal CLK2, the data item A is available at the output of the FIFO memory 10.

Figure 4:
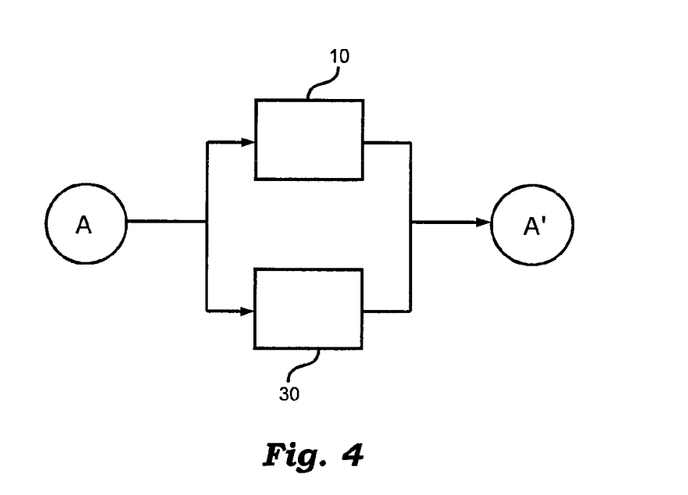
FIG. 4 shows a synchronization circuit including a module performing a data elaboration according to the solution described herein.

Successively, an elaboration module 30, shown in FIGS. 3 and 4, can perform an elaboration of the data read from the FIFO memory, for example in order to convert the data A into data A'. Such elaboration may comprise, for example, data encryption or bus inversion operations.

In an embodiment, the time needed for pointer synchronization is used for elaborating data, by reading a data item from memory, changing it and rewriting it into its original position in FIFO memory. Specifically, this operation can be performed in the write domain of FIFO memory, and therefore with the timings of the clock signal CLK1.

The condition that allows for the applicability of this solution is the following:

$$T1 < (Nff-1) \cdot T2 \quad (1)$$

wherein T1 is the period of the clock signal in the write domain (i.e. CLK1), T2 is the period of the clock signal in the read domain (i.e. CLK2) and Nff is the number of synchronization registers used in the read domain (i.e. CLK2).

FIG. 4 shows a possible architecture of a system for data synchronization through different frequency domains, according to the presently described solution.

In the considered embodiment, data item A is written as previously in FIFO memory 10 with the clock signal CLK1.

However, in this case, the elaboration module 30 performs the data elaboration in parallel with pointer synchronization. Elaboration is performed directly on the data written in the FIFO memory, before the data are read from FIFO memory. This means that already elaborated data A' are read from the FIFO memory.

It has been observed that if synchronization is only performed on the control path in a frequency conversion, it is possible to make any datapath elaboration parallel, without compromising in any way the robustness in the domain change.

The applicability of this solution depends on the related time variables, and it must be properly evaluated in order to guarantee the robustness needed in the frequency conversion. In particular, it is necessary to comply with equation (1), while taking into account the uncertainty margins brought about, for example, by the clock tree, by the setup and hold times of registers and by the propagation delays.

However, in order for the frequency conversion not to undergo any deterioration, the system must only guarantee that the data is stable at the moment when it is read by the FIFO memory.

For example, on the basis of the specific implementation adopted for pointer comparison, the available time for data elaboration can be extended by a further clock cycle. The pointer comparison (performed on signal S3 in FIG. 2) may require such a complexity as to having to resort to an additional cycle before using the data.

Figure 5:
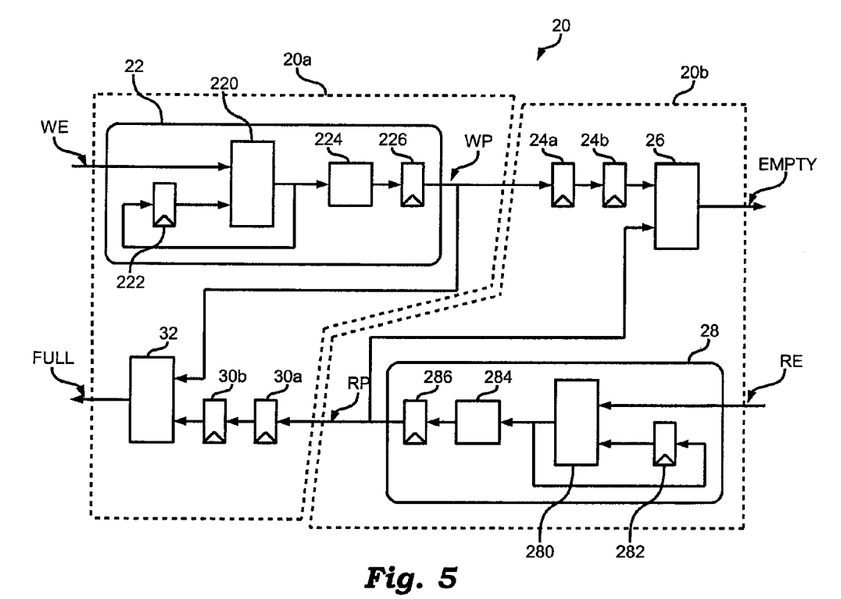
FIG. 5 shows an embodiment of a control circuit for a FIFO memory.

FIG. 5 shows in this respect a possible embodiment of a control circuit 20 of a FIFO memory.

In particular, the control circuit 20 comprises a first sub-circuit 20a, which is driven by the clock signal provided by the write module WM (i.e. signal CLK1), and a second sub-circuit 20b, which is driven by the clock signal provided by the read module RM (i.e. signal CLK2).

In the embodiment presently considered, the first sub-circuit 20a comprises a block 22, for example a counter, for generating a write pointer WP. For example, block 22 can increment the write pointer WP every time that a write enable signal WE shows that a new data item must be written in FIFO memory.

In the embodiment considered, block 22 is a Gray code counter.

For example, in the presently considered embodiment, the counter 22 comprises a binary counter including a binary adder 220 and a register 222. In this case, every time that signal WE indicates the writing of new data item in FIFO memory, the output value of the adder 220 is incremented.

In the embodiment considered, the output value of the adder 220 is forwarded to a block 224, that performs a Gray encoding in order to convert the write pointer from the binary code into the Gray code.

In the embodiment considered, a further register 226 is provided at the output of block 224, for saving the current Gray code write pointer.

In a substantially equivalent way, the second sub-circuit 20b comprises a block 28, for example a counter, for generating a read pointer RP. For example, block 28 can increment the read pointer RP every time a read enable signal RE indicates that a new data item must be read from FIFO memory.

In the embodiment considered, block 28 is a Gray code pointer.

For example, in the presently considered embodiment, the counter 28 comprises a binary code including a binary adder 280 and a register 282. In this case, every time the RE signal shows the reading of a data item from FIFO memory, the value at the output of adder 280 is incremented.

In the embodiment considered, the output value of the adder 280 is forwarded to a block 284, that performs a Gray encoding in order to convert the write pointer from the binary code into the Gray code.

In the embodiment considered, a further register 286 is provided at the output of block 284, for saving the current Gray code read pointer.

In the embodiment considered, the write pointer WP and the read pointer RP are used for generating a status signal, indicating a condition wherein the FIFO memory is empty (EMPTY) and a status signal indicating a condition wherein the FIFO memory is full (FULL).

For example, in order to generate the status signal EMPTY, the write pointer WP can be sent to a synchronization chain in sub-circuit 20b.

In the example presently considered, the synchronization chain for the write pointer WP comprises two registers 24a and 24b, driven by clock signal CLK2.

In the embodiment considered, the synchronized write pointer (i.e. the signal at the output of register 24b) is sent to a comparator 26, for determining the EMPTY status as a function of the synchronized write pointer and of the read pointer RP. Comparator 32 is similarly used to determine the FULL status.

In a substantially similar way, in order to generate the status signal FULL, the read pointer RP is sent to a synchronization chain in sub-circuit 20a.

For example, in the example presently considered, the synchronization chain for the read pointer RP comprises two registers 30a and 30b, driven by clock signal CLK1.

In the embodiment considered, the synchronized read pointer (i.e. the signal at the output of register 30b) is sent to a comparator 26, for determining the FULL status as a function of the synchronized read pointer and of the write pointer WP.

However, the specific implementation of the control module 20 (specifically the synchronization chain for the write pointer WP) is not important for the purposes of the present solution, but only the latency of such circuit is meaningful.

Figure 6:
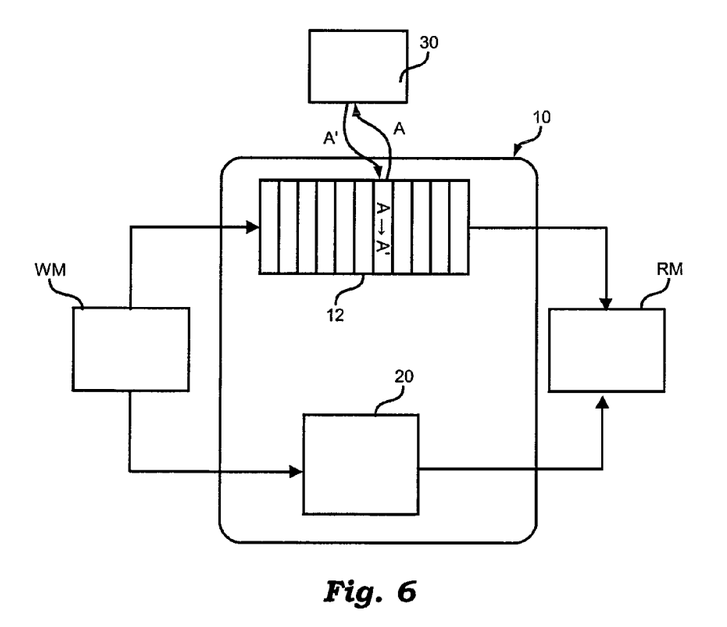
FIGS. 6 to 9 show possible embodiments of the synchronization circuit of FIG. 4.

FIG. 6 shows a first embodiment of a conversion system adapted to perform a data elaboration in parallel with the synchronization of the write pointer WB.

As previously described with reference to FIG. 1, a write module WM can write data in memory 10 at the frequency of a first clock signal CLK1, and a read module RM can read data from memory 10 at the frequency of a second clock signal CLK2.

In the embodiment considered, the FIFO memory also comprises a control circuit 20, for example the control circuit shown in FIG. 5, for controlling the respective write and read pointers, and/or, as the case may be, for generating FULL and EMPTY status signals.

However, in this case a module 30 is provided which can modify the content of the memory locations in the FIFO memory.

For example, in the embodiment considered module 30 can read a value A from a location in memory 12, elaborate the data and rewrite the modified data item A' in the same location in memory 12.

In an embodiment, memory 12 is implemented via registers. In this case, the read and write access to memory 12 through module 30 may be implemented via a multiplexer. For example, every memory location can be associated to a multiplexer, allowing selection of which module can execute a write access to a certain location in memory 12 (i.e. either the write module WM or the module 30), while the read access can be performed in parallel.

In an embodiment, memory 12 is a RAM memory. In this case, in order to allow an independent access to memory 12, a memory with dual read and write port can be used. For example, the memory may comprise a second read and write access, for a direct memory access (DMA).

In general, there cannot be write conflicts on the elaborated data item, because its location contains a data item which has just been written and cannot be rewritten until the data has been read. As for the reading of the data item to be elaborated, it can take place in parallel with other possible readings taking place of already elaborated data.

Figure 7:
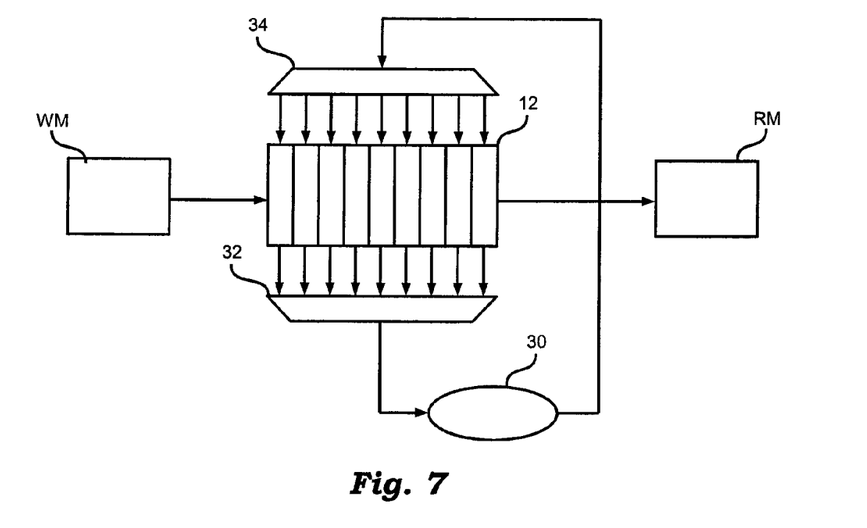

For example, FIG. 7 shows a possible embodiment of a synchronization system comprising a dual port memory 12.

In this case, the memory comprises a write and read interface for the WM and RM modules, and a write and read interface 32 for module 30. For example, the read interface 32 for module 30 can be obtained via one or more multiplexer(s), and the write interface 34 can be obtained via one or more demultiplexer(s).

However, in general, the access system and the related control logic will only have to ensure the ability to rewrite a data item, which has just been elaborated in memory 12, simultaneously with a normal writing in memory 12, performed in another location.

In an embodiment, the read interface 32 and the write interface 34 point to the last position written in memory 12. For example, this solution is useful if module 30 is only a combinational circuit. In this case, the elaborated value can be rewritten in the same location of memory 12 with the following front of clock signal CLK1.

For example, the location in memory 12 can be determined as a function of the write pointer WP or in case directly from the signal at the output of the binary counter 220.

The presently described frequency conversion can also take place between a more rapid clock domain (CLK1) and a slower clock domain (CLK2). In this case the applicability condition is much more likely to be complied with. In this case even one single synchronization register may be sufficient to satisfy equation (1).

The time available for the data elaboration might also be sufficient to use a more complex sequential module, instead of a combinational logic.

Figure 8:
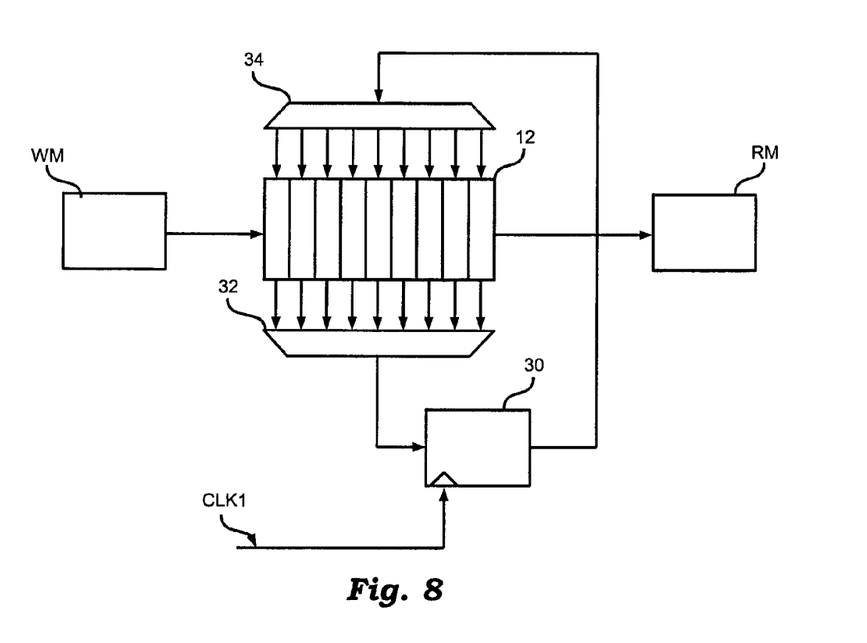

For example, FIG. 8 shows an embodiment wherein a sequential circuit 30 is used. In this case, the clock signal for circuit 30 is provided by the write module WM, i.e. the clock signal CLK1 for circuit 30 is provided by the write module WM, i.e. the clock signal CLK1 is used as a clock signal for module 30.

In general, the operating frequency of the sequential module 30 can also be a different clock signal.

For example, by providing the sequential module with a multiple clock of CLK1, the data elaboration may be segmented into multiple sub-operations that require information buffering (e.g. this might be necessary for algorithmic calculations or for encrypting operations of the data before its writing in the memory 12).

Figure 9:
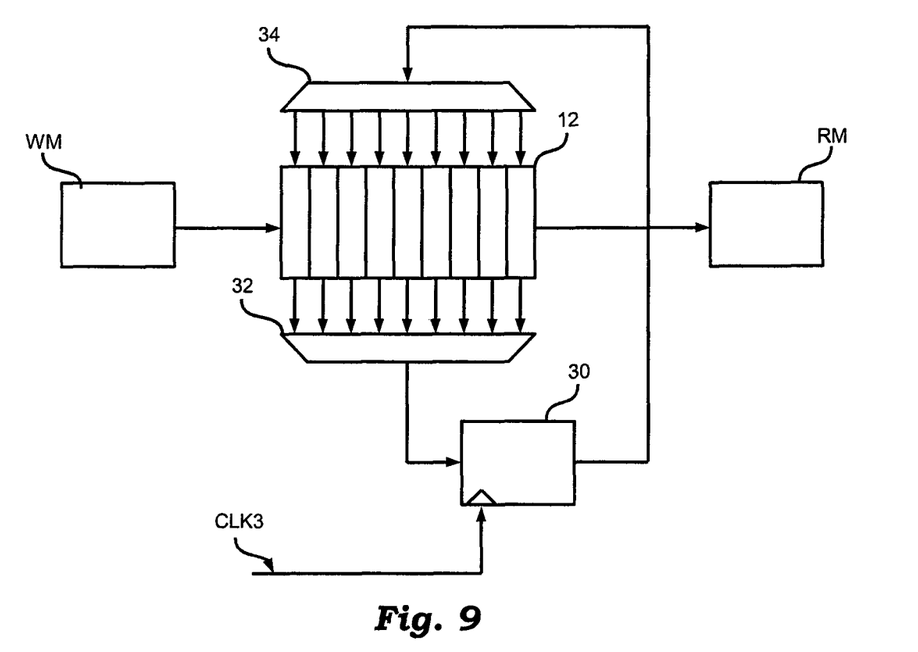

For example, FIG. 9 shows an embodiment wherein module 30 uses a clock signal CLK3.

In this case, the problem may occur of having a further frequency conversion between the signal domains CLK1 and CLK3.

In an embodiment, in order to ensure the system stability and to compensate for the necessary synchronization, the clock signal CLK3 is much more rapid than the clock signal CLK1. In this case the same considerations as in the case of the synchronization between the signal domains CLK1 and CLK2 may be applied to the synchronization between the signal domains CLK1 and CLK3 as well.

In an embodiment, in order to avoid a synchronization, the clock signal CLK3 can be correlated with the clock signal CLK1. For example, the clock signal CLK1 can be obtained via a division of the clock signal CLK3.

For example, in the embodiment considered in FIG. 9, the operating frequency of the sequential module 30 is a multiple (for example double or triple) of the original frequency of the clock signal CLK1.

In this case, the overall absolute calculation time would be kept similar and corresponding to the available time (on the basis of the previous considerations), but it would be subdivided into various time units, allowing for a higher elaboration flexibility.

The present solution minimizes therefore the overall latency of sequential digital interconnections that require frequency conversion and data elaboration. These needs are commonly found in SoC or SoP (System in Package) assemblies, wherein the data elaboration may be due both to safety and to power consumption reduction requirements.

For example, a data encryption meeting the timing requirements described in the disclosure may be completely embedded and integrated in parallel with the frequency conversion, for example before reaching the memory controller and leaving the chip.

The need for a power consumption reduction may on the contrary be felt in SoPs, in the communication from one chip to another. As a matter of fact, it may turn out as advantageous to perform elaborations on the bus, in order to reduce the switching activity of single bits. Typically, these elaborations are performed serially by dedicated modules or components. The proposal would also allow, in this case, to integrate such algorithms into frequency conversions.

Finally, nothing opposes to locating some phases of the datapath processing, linked with DSP (Digital Signal Processing) algorithms, in turn, into the same context of conversions between asynchronous clock domains.

Of course, without prejudice to the underlying principles of the invention, the details and the embodiments may vary, even appreciably, with respect to what has been described by way of example only, without departing from the scope of the invention as defined by the claims that follow.

We claim:

1. A system comprising a memory and a control circuit, wherein said control circuit comprises:
    a write interface for writing data in said memory with a first clock signal, wherein said write interface is configured for operating with a write pointer in response to a write command;

a read interface for reading data from said memory with a second clock signal, wherein said read interface is configured for operating with a read pointer in response to a read command;

a synchronization circuit for synchronizing said write pointer and said read pointer with a synchronization latency; and an elaboration circuit for elaborating data in said memory with an elaboration latency, said elaboration latency being smaller than said synchronization latency, wherein the system is configured so that synchronization circuit and the elaboration circuit can perform the respective synchronizing and elaborating in parallel.

2. The system according to claim 1, wherein said elaboration circuit is configured for:

receiving from a memory location in said memory the last data written to said memory via said write interface;

elaborating said last data received from said memory location; and sending said elaborated last data to said memory location.

3. The system according to claim 1, wherein said elaboration circuit is a combinational circuit.

4. The system according to claim 1, wherein said elaboration circuit is a sequential circuit.

5. The system according to claim 4, wherein said sequential circuit is driven by said first clock signal or a clock signal having a rate being equal to a multiple of the rate of said first clock signal.

6. The system according to claim 1, wherein said memory comprises a dual port RAM memory, and wherein the first port of said memory is coupled to said control circuit, and the second port of said memory is coupled to said elaboration circuit.

7. The system according to claim 1, wherein said synchronization circuit comprises at least one register for receiving as input said write pointer, and wherein said at least one register is drivable via said second clock signal.

8. The system according to claim 1, wherein said write interface and said read interface comprise a respective counter.

9. The system according to claim 1, wherein said control circuit is configured for managing said memory as a circular buffer, and wherein said control circuit comprises means for generating as a function of said write pointer and said read pointer a status signal, which indicates a condition in which said circular buffer is empty, and/or a status signal, which indicates a condition in which said circular buffer is full.

10. The system according to claim 1, wherein said system comprises an integrated circuit.

11. A method of operating a system comprising a memory and a control circuit, comprising:

writing data in said memory with a first clock signal, wherein said write interface is configured for operating with a write pointer in response to a write command;

reading data from said memory with a second clock signal, wherein said read interface is configured for operating with a read pointer in response to a read command;

synchronizing said write pointer and said read pointer with a synchronization latency; and elaborating data in said memory with an elaboration latency, said elaboration latency being smaller than said synchronization latency;

latency, said elaboration latency being smaller than said synchronization latency, wherein the synchronizing and elaborating are performed in parallel.

12. The method of claim 11 further comprising:

receiving from a memory location in said memory the last data written to said memory via said write interface;

elaborating said last data received from said memory location; and sending said elaborated last data to said memory location.

13. The method of claim 11, wherein elaborating data is provided by a combinational circuit.

14. The method of claim 11, wherein elaborating data is provided by a sequential circuit.

15. The method of claim 14, wherein said sequential circuit is driven by said first clock signal or a clock signal having a rate being equal to a multiple of the rate of said first clock signal.

16. The method of claim 11, wherein said memory comprises a dual port RAM memory.

17. The method of claim 11, wherein said synchronizing is provided by at least one register for receiving as input said write pointer, and wherein said at least one register is drivable via said second clock signal.

18. The method of claim 11, wherein said writing and reading are provided by a respective counter.

19. The method of claim 11, further comprising managing said memory as a circular buffer, and generating as a function of said write pointer and said read pointer a status signal, which indicates a condition in which said circular buffer is empty, and/or a status signal, which indicates a condition in which said circular buffer is full.

20. The method of claim 11, wherein said method is performed on an integrated circuit.

* * * * *